(No Model.)
W. T. McCLOSKEY.
WATER GATE.
No. 401,788. Patented Apr. 23, 1889.
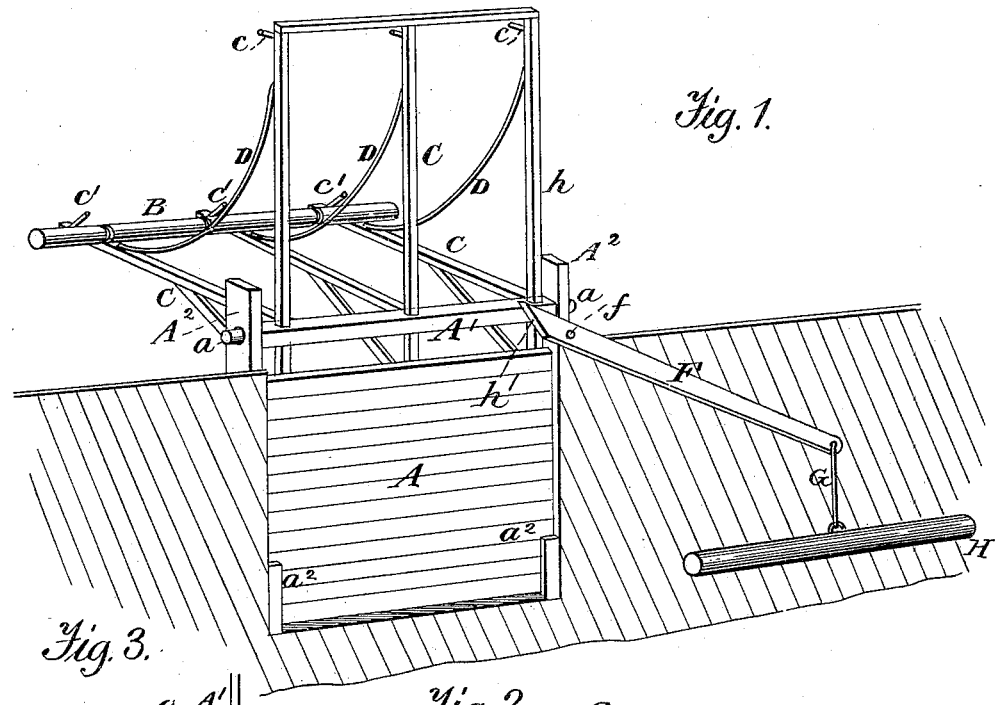
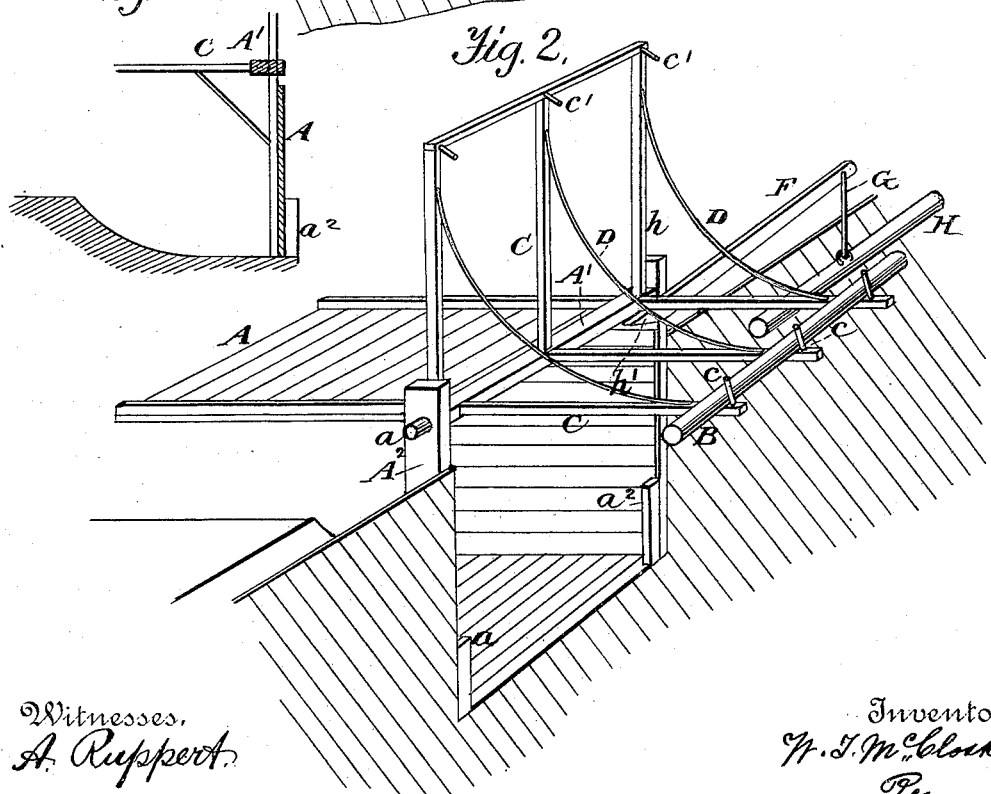
Witnesses.
A. Ruppert.
H. A. Daniels.
Inventor,
W. T. McCloskey
Per
Thomas P. Simpson
Attorney.

UNITED STATES PATENT OFFICE.

WILLIAM TIPTON McCLOSKEY, OF WESTPORT, PENNSYLVANIA.

WATER-GATE.

SPECIFICATION forming part of Letters Patent No. 401,788, dated April 23, 1889.

Application filed June 18, 1888. Serial No. 277,443. (No model.)

*To all whom it may concern:*

Be it known that I, WILLIAM TIPTON MC-CLOSKEY, a citizen of the United States, residing at Westport, in the county of Clinton and State of Pennsylvania, have invented certain new and useful Improvements in Water-Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to hold a pivoted water-gate open or closed at low and high water, respectively, the water affording the power to automatically open or close it.

Figure 1 is a perspective view showing the water-gate closed; Fig. 2, a similar view showing it open, and Fig. 3 a detail view in section.

In the drawings, A represents my water-gate having the squared bar $A'$, pivoted at $a\ a$ in the gate-frame $A^2$ and turning on the curve $a'$ to rest against stops $a^2$. It is also provided with a frame, C, having the curved tracks D, on which rolls a log, B, grooved to fit thereon and prevent lateral displacement. I may use balls running in curved tubes or any sliding weights to move from stops $c$ to stops $c'$, said weight being made sufficient to resist the pressure of the water until it rises to the high-water mark, then to yield, cause the roll B to run from the stops $c'$ to the stops $c$, and to be held by the weight. Thus I cause the gate to be opened automatically in case of a freshet or sudden rise of the water.

In order to shut the gate automatically, I employ the lever F, pivoted at $f$ to the gate-frame and at low water having the arm $h'$ raised by the weight of the float H, connected therewith by the rod G, so that the end $h'$ will turn the bar $A'$ and with it the gate A and its frame, when the weight B will roll from stops $c$ to the stops $c'$ and completely close the gate. A wicket-gate or two may be used so as to let the water pass through more easily. When the water rises to high-water mark, the lever end $h'$ will be out of contact with bar $A'$ and not prevent it from being turned by the pressure of the water.

What I claim as new, and desire to protect by Letters Patent, is—

1. The combination, with a pivoted water-gate, of the frame C, carrying rolling or sliding weights, which change position to hold the gate open or closed, as described.

2. The combination, with a water-gate having the pivoted bar $A'$, of the lever F, automatically operated by a float connected therewith by a rod, G, as and for the purpose set forth.

In testimony whereof I affix my signature in presence of two witnesses.

WILLIAM TIPTON McCLOSKEY.

Witnesses:
J. S. BAILEY,
LINDON SMART.